US008826400B2

(12) United States Patent  (10) Patent No.: US 8,826,400 B2
Amaya Calvo et al.  (45) Date of Patent: Sep. 2, 2014

(54) SYSTEM FOR AUTOMATED PREVENTION OF FRAUD

(71) Applicants: Antonio Manuel Amaya Calvo, Madrid (ES); Antonio Agustin Pastor Perales, Leganes (ES)

(72) Inventors: Antonio Manuel Amaya Calvo, Madrid (ES); Antonio Agustin Pastor Perales, Leganes (ES)

(73) Assignee: Telefonica, S.A., Madrid (ES)

( * ) Notice: Subject to any disclaimer, the term of this patent is extended or adjusted under 35 U.S.C. 154(b) by 73 days.

(21) Appl. No.: 13/730,197

(22) Filed: Dec. 28, 2012

(65) Prior Publication Data

US 2013/0212658 A1  Aug. 15, 2013

(30) Foreign Application Priority Data

Jan. 2, 2012 (EP) .................................. 12382001

(51) Int. Cl.
*H04L 29/06* (2006.01)
*H04L 12/58* (2006.01)
*G06F 21/51* (2013.01)

(52) U.S. Cl.
CPC .......... *H04L 63/1483* (2013.01); *H04L 63/083* (2013.01); *H04L 63/0236* (2013.01); *H04L 12/585* (2013.01); *G06F 21/51* (2013.01)
USPC ................ 726/6; 726/2; 726/3; 726/4; 726/5; 726/22; 713/168; 713/169; 713/170

(58) Field of Classification Search
CPC .............. H04L 63/083; H04L 63/0236; H04L 63/1441; H04L 63/1483; H04L 12/585; G06F 21/51
USPC .............................. 726/2–6, 22; 713/168–170
See application file for complete search history.

(56) References Cited

U.S. PATENT DOCUMENTS

2007/0039038 A1* 2/2007 Goodman et al. ................. 726/2
2007/0107053 A1* 5/2007 Shraim et al. .................... 726/22
2009/0216795 A1   8/2009 Cohen et al.

FOREIGN PATENT DOCUMENTS

GB        2 469 918 A     11/2010
WO   WO 2009/055785 A2    4/2009

OTHER PUBLICATIONS

European Search Report issued by the International Searching Authority (ISA/O.E.P.M) on Jun. 29, 2001 in connection with International Application No. EP 12 38 2001.

* cited by examiner

*Primary Examiner* — Kambiz Zand
*Assistant Examiner* — Noura Zoubair
(74) *Attorney, Agent, or Firm* — Gary J. Gershik; Cooper & Dunham LLP

(57) ABSTRACT

A system for preventing fraud at a service provider's website has a fake credential distributor for creating a set of valid but fake credentials to access such website and distributing such set to a plurality of predefined websites, a fake user database including said set of fake credentials and a monitor for real-time monitoring any user login attempt from any origin network location to the website and comparing the credentials used in such user login attempt with the set of fake credentials in the fake user database. If the credentials used in such a login attempt coincide with any fake credential in the fake user database, such origin network location is added to a tainted connections list; and if there is another login attempt of a user from a network location in said tainted connections list, said user access request is refused even when it is using real credentials.

16 Claims, 4 Drawing Sheets

SYSTEM FOR AUTOMATED PREVENTION OF FRAUD

This application claims priority of European Patent Application No. EP 12 38 2001.1, filed Jan. 2, 2012, the entire contents of which are hereby incorporated by reference into this application.

FIELD OF THE INVENTION

The present invention generally relates to the detection and prevention of fraudulent activities in computer networks, specifically related with supplantation of network identity.

BACKGROUND OF THE INVENTION

The current IT security landscape is dreary. Today, security threats are rapidly increasing. New variants of malware are continuously being developed and distributed. It is estimated that more malware has been developed on the last sixth months alone than on the rest of the computer science history.

Currently all aspects of the network experience are affected by security threats, from the quality of experience, to the network infrastructure. According to the latest 'Study on Information security and e-trust on Spanish Households', about 44% of users consider security a main limitation to restrict use of new services.

One of the main problems that commercial systems face today is identity theft. By supplanting a customer, a criminal might cause harm to the customer, the system, the system provider's reputation, or all of them. For example, if a bank customer has the identity of some customers stolen, its customers will suffer financial loss in the first stage. But the financial loss can possibly be transferred to the bank, depending on the legislation, and in any case the bank's reputation will suffer even if it wasn't its fault to begin with.

One of the easiest and main methods for a criminal to acquire a legitimate customer identity is by phishing. Phishing is a way of attempting to acquire sensitive information such as usernames, passwords and credit card details by masquerading as a trustworthy entity in an electronic communication. An example of phishing is a false mail from a bank stating that its customers have to go to some page and introduce their usernames and passwords.

Phishing attacks against banks started in 2003, with half a dozen attempts reported. The early attacks imitated bank websites, but were both crude and greedy. Since then the attacks have become more sophisticated. They often reuse genuine bank emails, just changing the URLS, for example.

Losses are growing extremely rapidly, with maybe $200 m in the USA in 2006, and $70 m in the UK. And Phishing is not restricted to banks anymore. Any online activity that has an associated economic value is a potential target. Thus, in the last years there have been attacks against targets as diverse as online gaming sites, email providers, payment processors, online auction sites, online shops, etc.

Some of the current client side solutions against phishing are detailed below:

Password Manglers: A password mangler is a piece of software, generally a browser plug-in that runs on the customer's device that modifies the password that the user enters for each URL. Thus, if the user enters as password 'abcd1234' for two different sites, the password that will actually be sent to the sites will be different for each, and different from the seed password 'abcd1234'. Thus, even if the user is fooled into visiting a phishing site, since the phishing site's URL will be different from the legitimate one, the password that will be sent will also be different (and useless to the phisher).

The problem with passwords manglers is that work fine in theory but are tricky to implement in practice, since there are some problems to implement them, such as:

Sites with different domains that share the passwords (such as amazon.com, amazon.co.uk) are a problem.

The automatically generated passwords might break some sites password rules.

The software must be already be in use when registering in a new site.

Some bank sites don't allow users to choose their own passwords.

Roaming is difficult for customers: they cannot just use another computer or device.

They don't protect against keyloggers at all.

It depends on the customer's discipline: customers have to install and maintain the password mangler software.

Client Certificates: SSL protocol supports certificates for the client as well as the server. Thus, a certificate could be used to identify the customer instead of a password. Since certificates can also be stolen if stored in software (and almost the same phishing methods would be valid to steal the certificate than the password), hardware stored certificates (such as the DNIe) could be used to identify users.

The problem is that client certificates stored on software do not add any actual protection against identity theft, since the criminals can ask for the key storage file instead of the user's password. Client certificates stored on hardware are an effective mechanism against some kinds of identity theft, but they require non standard hardware on the customer's device, and will not work on many of the current mobile devices.

Using the Browser's Password Database: Another line of defence could be choosing random passwords and letting the browser store them. This method is similar to the password mangler, since its main line of defence is that the browser will auto complete passwords based on the site domain, and thus it will not auto complete the password on the phishing's site.

This solution can be effective, but it will not protect against malware that just steals the password database, and it make user's roaming difficult. Besides, users will have to re-introduce the passwords on the databases of any mobile devices they use.

Soft Keyboards: This method consists in forcing the user to fill in the password using an in-screen keyboard and clicking on the images of the letters instead of typing them. It is mainly meant to defeat keyloggers.

The problem is that there currently exists software to defeat this protection. For example, the software can capture the screen for any number of pixels around each mouse click and send the images to the phisher so he can obtain the password.

Customer Education: Another line of defence is training customers into detecting the false sites, and to not install any suspicious applications on their computers. If the customers do not visit the phishing site and they do not install malware on their computer, then the phishing problem would go away.

However, this is an unending arms race. The legitimate sites tell the customers to search for some characteristic of the fake messages, so the phishers modify the messages and the process starts again. As the countermeasures grow they become no complex and counterintuitive that they confuse more and more customers, and at the end it works in favour of the attackers.

Besides the client-side solutions, there is a reactive defence mechanism for some sites on the server side/management side, such as banks. The reactive mechanism is to monitor the net trying to detect phishing sites. Once a phishing site is detected, the legitimate site will take measures to take down the phishing site (such as talking to their DNS provider to remove the phishing site DNS record, or talking to their ISP to take their site down). These reactive defence mechanisms work to limit the damage done on each attack (by closing the fake sites as soon as possible), but they do not eliminate the problem and they do nothing to identify customers that might have been affected before the fake site takedown.

Besides those mitigation measures, there are other measures based on injecting false data on the criminals (phishers) databases. Patent document US-2007/0107053-A1 describes a system to identify phishing sites and propagate a previously generated database of false data to them. Some items of the false data can be provided by the third party service provider, and will allow the third party service provider to evaluate the success of the poisoning. The problem with this solution is that it requires the false data to be previously provided. This restricts the dilution—defined as the ratio of false to real data—on the fake credentials database since the maximum dilution will depend on the false data database size. More importantly, only some of the false data is used to identify fraudulent access, and there is no way to identify legitimate users affected.

Also, patent document WO 2009/055785-A2 describes a system to be implemented on service provider systems—particularly banks—that based on a pre-generated database of false identifying data allows the detection of access to the false accounts, and the tracking of the actions executed by the criminals on the system, This solution also requires some false data to be previously provided, with a set of restrictions that severely limits the maximum practical size of the false data set. It allows the identification of an affected legitimate user, but with two important problems that make it ineffective:

Since the maximum dilution will be very small—caused by the limited size of the false data set—the effectiveness will be severely hampered. Only a small subset of the affected legitimate users will be detected.

More importantly, the detection is made after the fact—after the legitimate user account has been accessed and potentially the fraud has been committed.

All the existing antifraud or phishing mitigating measures try to avoid that customers of a service provide their credentials to a criminal network (phishers). But there is no bullet proof measure against phishing, and as such, every year thousands of accounts are compromised. Currently there are no methods to identify identity theft fraud before the fraud (be it read mail, distribute spam, or plain theft in case of bank credentials) has been committed. Some of the solutions allow the detection of the fraud, but after the fraud has been committed—and after the economic loss has happened. So the problem remains: how to detect identity theft before the actual harm—fraud—has been committed.

The authentication systems allow restricting access to web services, so that only those users with valid credentials are allowed to login. The basic authentication systems, which are most commonly used, are based on a previous registration process for the user to define its digital identity as a username and password. For users who have been victims of phishing, someone with this information because he has "stolen" it, could enter the system without being detected, as the basic authentication is based simply on knowing username/password. Although there are other safer authentication systems, the technical problem the invention seeks to address is how to prevent this "someone" who has "stolen" credentials from accessing the system (login), despite the fact that he knows the valid user name/password. Because basic authentication is based on knowing the user credentials—essentially username/password—, it is not known a priori (before the user reports the theft) whether a connection is legitimate or if a victim of phishing.

SUMMARY OF THE INVENTION

The invention refers to a system for automated phishing detection according to claim 1. Preferred embodiments of the system are defined in the dependent claims.

In order to overcome the problems posed by the existing systems for preventing fraud or phishing, the system of the present invention prevents unauthorized access (in principle legitimate) of a user to a web service when it is detected that the legitimate credentials of a users have been stolen, even before the user is aware of it.

According to a first aspect of the invention, a system is provided for preventing fraud of a web service offered by a service provider at a website, which system comprises:
  a fake credential distributor for automatic creating a set of valid but fake credentials to access such website of the service provider and for distributing such set of fake credentials to a plurality of predefined websites;
  a fake user database including at least said set of fake credentials;
  a real-time monitor connected between any possible user connection to such webpage and the service provider for real-time monitoring any user login attempt from any origin network location to the website, and for comparing the credentials used in such user login attempt with the set of fake credentials in the fake user database, and
  if the credentials used in such user login attempt coincide with any fake credential in the fake user database, such origin network location is added to an internal list of tainted connections; and
  if there is any other login attempt of a user from an origin network location in said list of tainted connections, said user access request is refused, even when it is using real credentials and such user is redirected to a pre-established webpage not enabling such user to access the web service.

The current invention allows service providers to identify users that have been compromised a priori, before their accounts are used to commit any harm against the users or the service, and even to identify external users that are either compromised or part of the criminal network.

Compared to the existing prior art, the present invention has the following advantages:

Efficient: The maximum dilution ratio can be defined dynamically and it is not limited by any practical consideration. Thus, the inverse dilution ratio (1/dilution) can be made as close to zero as desired, ensuring the effectiveness of the detection.

More importantly, the detection of affected legitimate users is made before the fact—before the legitimate user account has been accessed and before the potential fraud has been committed.

Integration on the Third Party Service can be executed without realizing any alteration whatsoever on the Third Party Service systems. The TPS providers do not need to execute changes on their applications, their systems, their database, or the data stored on the aforementioned databases.

Preferably, adding an origin network location to the internal list of tainted connections is carried out by means of IP, geolocation, and/or persistent cookie injection.

Each origin network location in the internal list of tainted connection is preferably associated with one or more of the plurality of predefined websites that have been previously poisoned.

The plurality of predefined websites to be poisoned can be pre-populated by an external user of the system by means of an interface.

Each credential preferably includes one or more of the following: username, password and PIN.

BRIEF DESCRIPTION OF THE DRAWINGS

To complete the description and in order to provide for a better understanding of the invention, a not of drawings is provided. The drawings form an integral part of the description and illustrate the preferred embodiments of the invention, which should not be interpreted as restricting the scope of the invention, but just as examples of how the invention can be embodied. The drawings comprise the following figures.

DETAILED DESCRIPTION OF THE PREFERRED EMBODIMENTS

The system for automated phishing protection is based on the development of specific hardware and software residing on or near the network nodes, which act as identity theft protection (phishing protection), working on three axis:

The system poisons phishing sites by injecting fake credentials (usernames, passwords, PINS, etc.). This way, the phisher database value decreases, since its quality is worse.

The system monitors all user logins to the protected sites. Once a fake credential login is detected, the system marks the origin as suspicious (by several mechanisms, such as IP, geolocation, and persistent cookie injection).

Whenever a legitimate user login is detected on a suspicious origin, the legitimate user is marked as compromised. The login attempt is redirected to a 'system temporally out of service' page, and the protected site is informed of the compromised user so it can take further actions.

Figure 1:
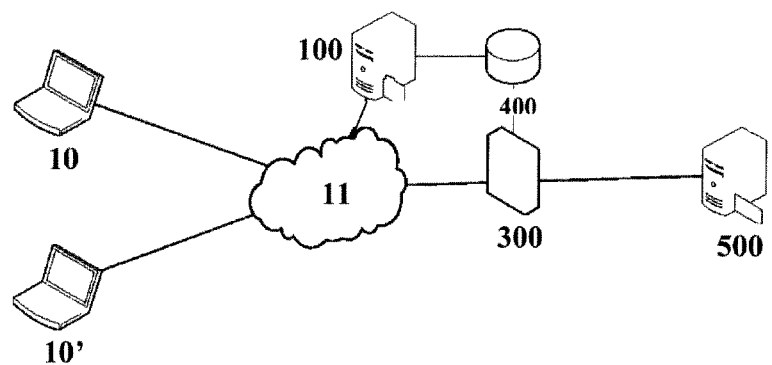
FIG. 1 schematically shows how the inline monitor is integrated in an existing connection between a user and a TPS.

As shown in FIG. 1, the system operating in an inline mode, in which it actively monitors login transactions of the protected systems (see FIG. 1). In order to transparently handover the session to the protected systems once the system has determined them to be safe ones, the method described in Spanish patent application P201131889 is used.

According to a preferred embodiment of the system of the invention, as shown in FIG. 1, the system has the following main components:

A fake credential distributor 100. This component is used to inject fake credentials (poisoning) into the detected phishing sites. The poisoning is executed in parallel with the currently implemented mechanism to close the phishing site.

A fake users DB 400. This component includes a database containing the credentials of the fake users. The database is automatically populated by the fake credential distributor 100 whenever it poisons a new phishing site.

As shown in FIG. 1, the inline monitor 300 is installed in line with the Third Party Service 500. This way, the inline monitor 300 monitors traffic existing between any customer 10, 10' connected to the third party service TPS 500 by means of, for example, the Internet 11.

The system of the invention can be integrated either on the network infrastructure of the third party service provider, or directly on the third party service provider ISP infrastructure.

Figure 2:
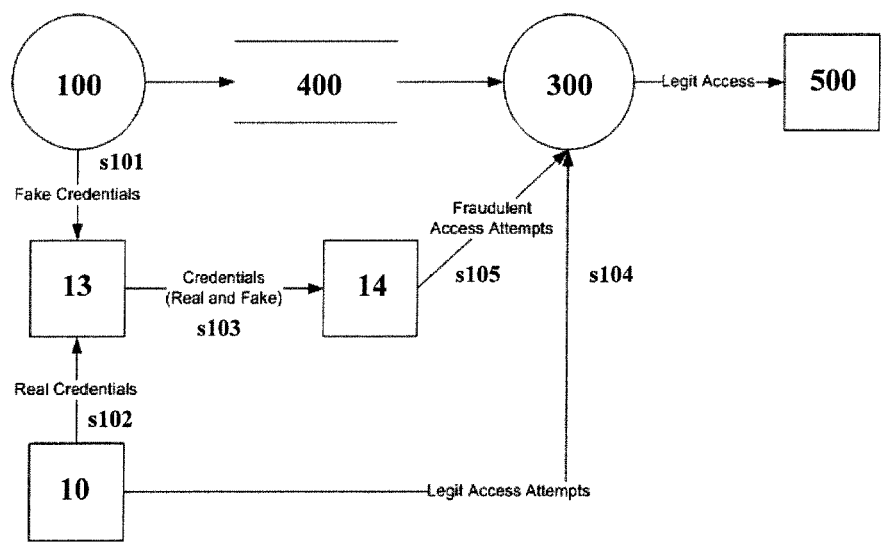
FIG. 2 schematically shows how the system of the invention operates.

FIG. 2 schematically shows an example of the system the invention is used. In the scheme shown:

A criminal site 13 (phishing site) is detected. The fake credential distributor 100 injects fake credentials into the site (step s101). At the same time, the criminal site 13 is being accessed by legitimate users 10 who are also providing their legitimate credentials (step s102).

At a later stage, the criminal site 13 distributes its stolen credential database to some access points 14 (step s103), generally on bots (criminal controlled personal computers). The stolen credential database therefore includes both real and fake credentials. One of the purposes of the fake credential distributor 100 is to make the ratio between the number of real credentials and the number of fake credentials as close to zero as possible. To this extent, a huge number of fake credentials are injected.

The inline monitor 300 monitors all accesses attempts to the third party service provider 500, both legitimate (step s104) and fraudulent (step s105). It filters fraudulent accesses, and it only allows legitimate access attempts to proceed.

A detailed description of each component of the system follows.

The fake credential distributor 100 is required for the complete fraud protection system. As such, a preferred implementation is described although since parts of it exist on the current state of the art, its function can be provided by an external system.

Figure 3:
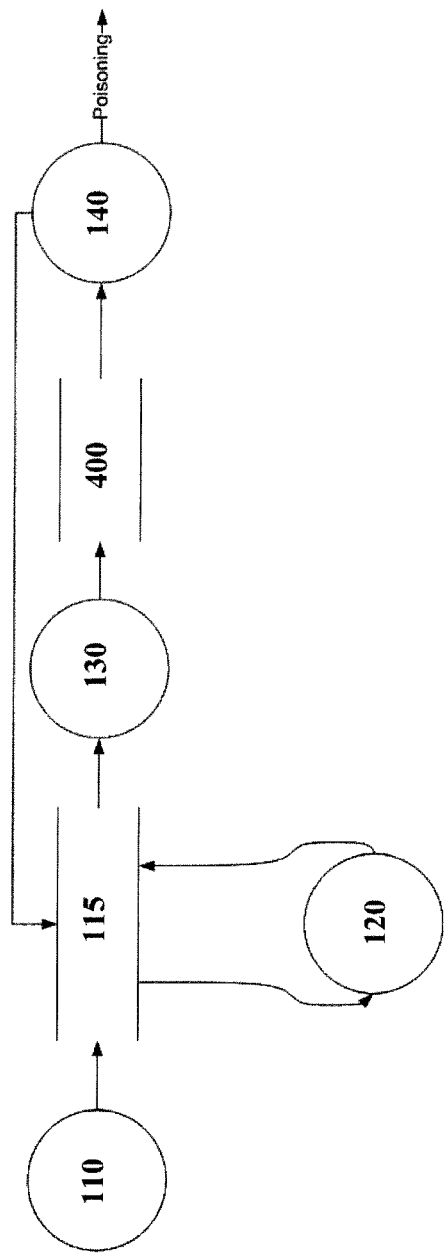
FIG. 3 shows the main modules of the fake credential distributor.

The module provided on the preferred implementation of the system will have five main components, (as shown in FIG. 3):

Administrative interface 110. This interface (User Interface, via Web for example, or API interface, like REST, SOAP, etc.) allows the system administrators to initiate the poisoning of some phishing site. To that extent, the system administrator provides the URL of the phishing site and, optionally, the protected service the phishing site is supplanting.

Administrative DB 115. This database stores the administrative information for the sites that have to be poisoned or have been poisoned. The stored information includes:

URL of the poisoned site.

Page analysis of the poisoned site to identify the fields that have to be populated there (provided by a Site Analyzer 120).

List of fake users that have been provided to each phishing site. If the users provided to each site are kept unique that can help to identify which site has compromised the customers of a protected service Site Analyzer 120. This module executes an automatic analysis of the phishing site, to identify the forms that have to be populated and the fields that must be passed to the phishing site. This site analyzer is, then, a specific kind of web crawler: it crawls on all the pages accessed from a given URL, detects web forms, analyzes the data that must be provided to fill in the forms, and introduces this information on the administrative DB 115.

DB Populator 130. This module generates valid user records for a phishing site. To this extent, this module uses the information generated by the site analyzer 120 (forms detected, number, name and type of data fields on each form). A valid user record contains the information that the phishing site requests. This module can be skipped if the protected TPS prefers to use a pre-populated Fake Users database.

Site Poisoner 140. This module uses the credentials stored on the Fake Users DB for a given Phishing site to poison the phishing site database. To that extent it repeatedly calls the form submitted on the phishing site, using different data on each call. To avoid detection by the phishers, this module can use different IPs for each call. The IPs can be obtained from a pool of valid IPs or, once the module has determined that the answers to the calls are of no relevance, it can also use randomly generated IPs.

Fake Users DB 400. This database contains the credentials of the fake users. The database is automatically populated by module 100 whenever it poisons a new Phishing site. The automatic population can follow some internal rules provided by the TPS. The database includes the credential data (usernames, passwords, PINs, etcetera) that have been populated to some phishing site, along with an indication of which phishing site or sites they were propagated to, and the moment when they were propagated.

The inline monitor 300 analyzes any login connection to the Third Party Service in real-time, and automatically detects any login attempts to the service provider's web service using fake user credentials.

According to the invention, the Third Party Service TPS does not have to execute any kind of control of suspicious connection. It is completely transparent for the service provider, it does not need to modify its systems or service.

Figure 4:
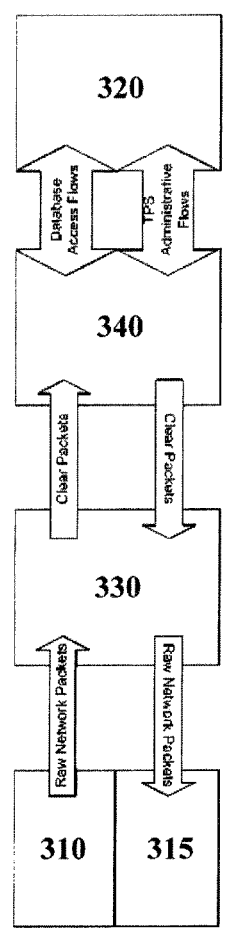
FIG. 4 shows the physical architecture of the inline monitor.

The inline monitor is implemented by specific hardware, having the architecture shown in FIG. 4. The main components of the inline monitor 300 are as follows:

An input network interface 310: this interface provides access to a communication network. In the preferred embodiment of the invention, this input network interface is implemented by a Network Interface Card (NIC). Data packets coming from the client side of the connection enter the inline monitor 300 via this interface.

An output network interface 315: this interface provides access to a communication network. In the preferred embodiment of the invention, this output network interface is implemented by a Network Interface Card (NIC). Data packets coming from the client side of the connection enter the inline monitor 300 via this interface.

A control network interface 320: this interface provides access to a communication network. In the preferred embodiment of the invention, this control network interface is implemented by a Network Interface Card (NIC). The inline monitor 300 uses this interface to implement its administrative communication needs—that is, all the communications which are not part of a customer/TPS communication are processed by this interface.

A ciphering module 330: it manages the ciphered sessions, on a way transparent for both sides of the ciphered communications.

A processing module 340: it includes a processor. RAM memory, and some persistent storage memory in order to maintain an internal list of connections received from the ciphering module.

Figure 5:
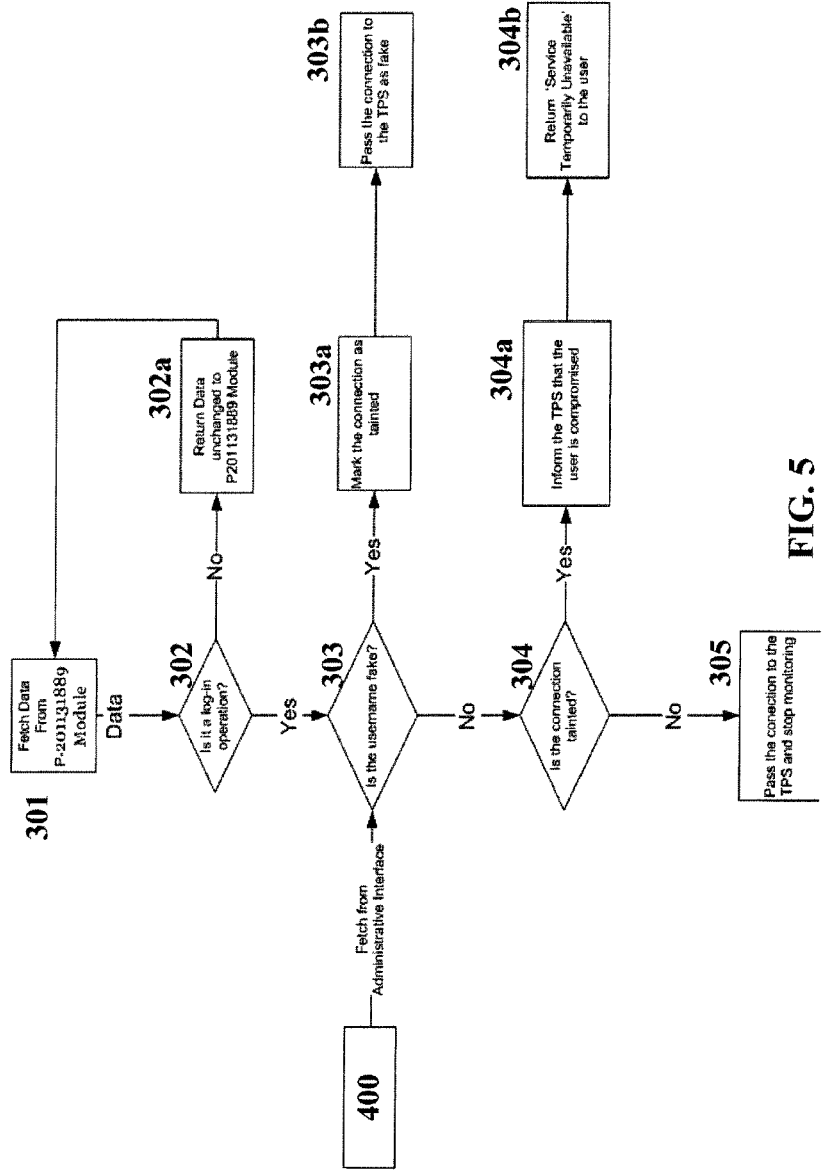
FIG. 5 shows a flowchart of the operation of the inline monitor.

For each connection, this processing module 340 implements the following procedure (as shown in FIG. 5):

301. Data from the ciphering module 330 is fetched, and unencrypted into network packets. Packets are accumulated until a complete HTTP request is formed, which request is passed, along with the TCP information (source and destination address, source and destination ports) to the following decision making step 302.

302. This HTTP request is monitored to check if it is a login operation for a protected TPS. If it is not a login operation, the data is returned unchanged to the ciphering module 330 (step 302a) so it can forward such data to the correct destination, the Third Party Service.

303. If it is a login operation, the credentials are extracted from the HTTP request, and they are checked against the credentials on the fake users database 400 to verify if the credentials correspond to a fake user. To that extent, the control network interface 320 is used. According to another embodiment of the invention, the fake users database 400 can have a local copy (on the persistent storage of the processing module 340) and the query is local. If the credentials are found on the fake user database 400 and the username is fake, then:

303a. The connection is internally marked as tainted—a tainted connection is a connection used to commit fraud—. For the purpose of checking if a connection is tainted, a connection is defined by one or more of the following factors (and then, two connections are determined to be the same if the corresponding factors are equal):

a. Originating IP of the connection: Once some false credential data has been sent from a given IP, all the connections originating from the same IP are considered tainted.

b. Originating IP and port of the connection: In case a finer detection of connection is desired (because the system wants to distinguish between legitimate and tainted connection behind a NAT server), both the originating IP and originating port can be used to define a connection. In this case, an encapsulating range for the originating port is marked as tainted too. For example, if the originating connection is made from port 3000, the server can mark as tainted all ports between 2500 and 3500.

c. Identifying cookie: The system can inject a tracking cookie on each new connection it detects. The cookie can then be used to identify a connection, for the tainting purposes.

d. IP and Time: If the system is integrated within an ISP, it can also detect IP changes, and it identifies connections even through IP changes. IP and time of connection are used to identify the same end-point of the connection.

e. SSL status: On Third Party Services that provide the authentication mechanisms through TLS/SSL, the SSL negotiation status is also used to identify connections. Thus, a connection that reuses a previous SSL negotiation (common practice when using the same client session to execute several HTTPS requests), is identified as the same connection for tainting purposes.

And,

303b. The connection is passed to the TPS as fake. There are two ways to implement this step: The control network interface 320 can be used, as an offside channel, to communicate the fraud attempt data to the TPS, or the normal output network interface 315 can be used. If the second option is chosen, then the credentials are substituted with a pre-arranged set of credentials. The TPS can decide to drop the connection, or to let the fake user operate to gather more data.

304. If the username is not fake, than it is checked if the connection has been previously marked as tainted. The connection is, for this purpose, as defined in step 303a. The system looks up the current connection on the internal list of tainted connections.

If the current connection is on the list and it has been marked as tainted then:

304*a*. The TPS is informed that the credentials of a legitimate user have been compromised. To this extent, the control network interface 320 is used. And,

304*b*. A HTTP response is composed with a pre-defined page that specifies that the 'Service is Temporarily Unavailable'. The composed answer is returned to the ciphering module 330, using the source address as destination, and the destination address as source. That is, for this communication, the system impersonates the Third Party Server.

305. If the connection has not been marked as tainted, the connection is considered legitimate. Then, the processing module 340 returns the data un modified to the ciphering module 330 so that the data are handled to the TPS, and it stops monitoring the connection.

There are essentially two possible embodiments for the inline monitor 300:

As a processing expansion card to be integrated into currently deployed network elements such as routers. In this embodiment, the Input Network Interface and Input Output Interface are physically provided by the network element, and the expansion card will only have logical access 10 ports to read and write data from the physical elements. The Control Network Interface can be provided by the expansion card, or it can also be provided by the network element.

As an stand-alone component. In this case, all the elements of FIG. 4 are physically implemented, and all the Network Interfaces are implemented by NICs (Network Interface Cards).

As indicated before, the present invention relates to a system for automated phishing protection. It is to be understood that the above disclosure is an exemplification of the principles of the invention and does not limit the invention to the described embodiments.

The invention claimed is:

1. A system for preventing fraud of a web service offered by a service provider at a website, which comprises:
   a fake credential distributor for automatically creating a set of valid but fake credentials to access such website of the service provider and for distributing such set of fake credentials to a plurality of predefined websites;
   a fake user database including at least said set of fake credentials;
   a real-time monitor connected between any possible user connection to such website and the service provider for real-time monitoring any user login attempt from any origin network location to the website, and for comparing the credentials used in such user login attempt with the set of fake credentials in the fake user database, and if the credentials used in such user login attempt coincide with any fake credential in the fake user database, such origin network location is added to an internal list of tainted connections; and if there is any other login attempt of a user from an origin network location in said list of tainted connections, said user access request is refused, even when it is using real credentials and such user is redirected to a pre-established webpage not enabling such user to access the web service.

2. The system according to claim 1, wherein adding an origin network location to the internal list of tainted connections is carried out by means of IP address, geolocation, and/or persistent cookie injection.

3. The system according to claim 1, wherein each origin network location in the internal list of tainted connections is also associated with one of a plurality of predefined websites that have been poisoned.

4. The system according to claim 1, wherein a plurality of predefined websites to be poisoned is pre-populated by an external user of the system by means of an interface.

5. The system according to claim 1, wherein each credential includes one or more of the following: username, password and PIN.

6. The system according to claim 2, wherein each origin network location in the internal list of tainted connections is also associated with one of a plurality of predefined websites that have been poisoned.

7. The system according to claim 2, wherein a plurality of predefined websites to be poisoned is pre-populated by an external user of the system by means of an interface.

8. The system according to claim 3, wherein the plurality of predefined websites to be poisoned is pre-populated by an external user of the system by means of an interface.

9. The system according to claim 6, wherein the plurality of predefined websites to be poisoned is pre-populated by an external user of the system by means of an interface.

10. The system according to claim 2, wherein each credential includes one or more of the following: username, password and PIN.

11. The system according to claim 3, wherein each credential includes one or more of the following: username, password and PIN.

12. The system according to claim 4, wherein each credential includes one or more of the following: username, password and PIN.

13. The system according to claim 6, wherein each credential includes one or more of the following: username, password and PIN.

14. The system according to claim 7, wherein each credential includes one or more of the following: username, password and PIN.

15. The system according to claim 8, wherein each credential includes one or more of the following: username, password and PIN.

16. The system according to claim 9, wherein each credential includes one or more of the following: username, password and PIN.

* * * * *